US010255297B2

(12) United States Patent
Chang et al.

(10) Patent No.: US 10,255,297 B2
(45) Date of Patent: Apr. 9, 2019

(54) METHOD AND SYSTEM FOR MANAGING IMAGES TO BE INCLUDED IN A FILE

(71) Applicant: KYOCERA Document Solutions Inc., Osaka (JP)

(72) Inventors: Michael M. Chang, El Segundo, CA (US); Eric Pugh, El Segundo, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 739 days.

(21) Appl. No.: 14/674,217

(22) Filed: Mar. 31, 2015

(65) Prior Publication Data

US 2016/0291855 A1 Oct. 6, 2016

(51) Int. Cl.
*G06F 3/00* (2006.01)
*G06F 17/30* (2006.01)

(52) U.S. Cl.
CPC .. *G06F 17/30277* (2013.01); *G06F 17/30268* (2013.01)

(58) Field of Classification Search
CPC ............ G06F 17/30277; G06F 17/30268
See application file for complete search history.

(56) References Cited

U.S. PATENT DOCUMENTS

| | | | | |
|---|---|---|---|---|
| 7,051,019 | B1* | 5/2006 | Land | G06F 17/30265 |
| 7,503,007 | B2* | 3/2009 | Goodman | G06Q 10/107 |
| | | | | 707/999.104 |
| 9,081,533 | B1* | 7/2015 | West | G06F 3/1272 |
| 2007/0300158 | A1* | 12/2007 | Kasperkiewicz | ............ |
| | | | | G06F 17/30017 |
| | | | | 715/731 |
| 2008/0313572 | A1* | 12/2008 | Waldman | G06F 17/30038 |
| | | | | 715/854 |
| 2010/0211885 | A1* | 8/2010 | Berg | G06F 17/243 |
| | | | | 715/745 |
| 2012/0260188 | A1* | 10/2012 | Park | G06Q 10/107 |
| | | | | 715/739 |
| 2014/0215342 | A1* | 7/2014 | Watanabe | G06F 3/04886 |
| | | | | 715/732 |

OTHER PUBLICATIONS

2015 Electronic Imaging Science and Technology Technical Summaries, IS&T and SPIE, Feb. 2015, San Francisco, CA.

* cited by examiner

*Primary Examiner* — Omar R Abdul-Ali
(74) *Attorney, Agent, or Firm* — McDonnell Boehnen Hulbert & Berghoff LLP

(57) ABSTRACT

A method and system for managing images are provided. In one example, the system determines a category of a file being edited by a user in response to a user action indicating an intent to include in the file an image associated with an entity. Based on the category of the file, the system presents predetermined images associated with the entity for user selection of the image to be included in the file.

27 Claims, 19 Drawing Sheets

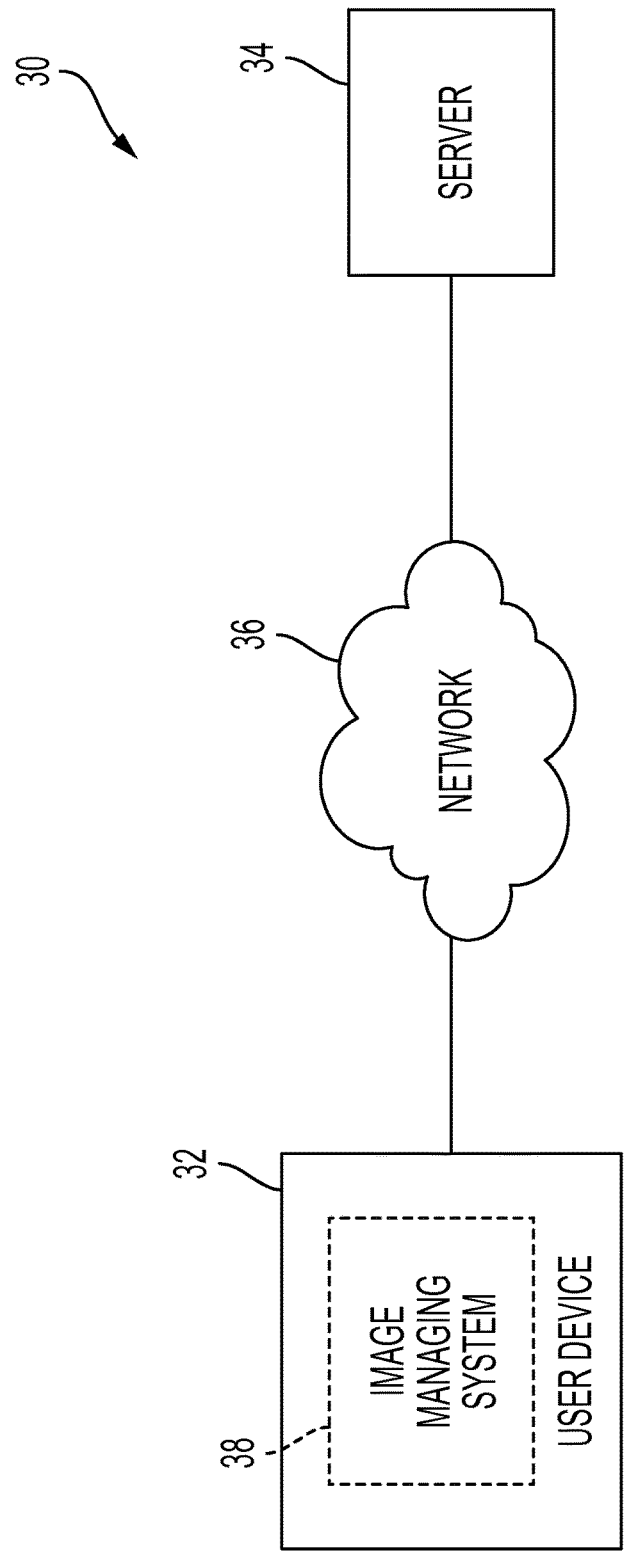

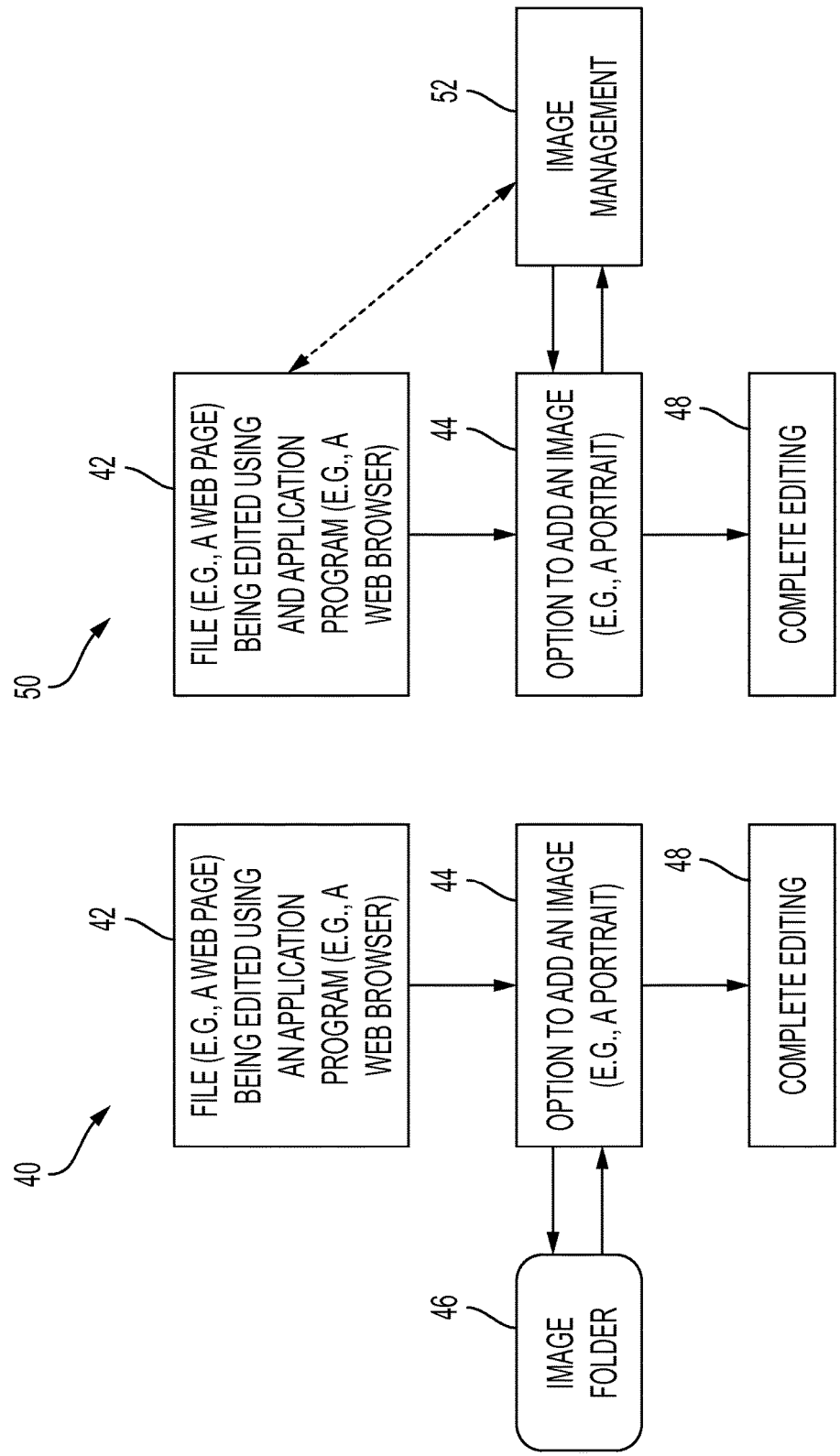

METHOD AND SYSTEM FOR MANAGING IMAGES TO BE INCLUDED IN A FILE

BACKGROUND

Users often include images in a variety of files, such as web pages and/or other types of files. In particular, users often share images that bear a likeness of the user (e.g., a digital portrait-type image) with other users, such as general public, peers, friends, family, etc. As one example, it is common for a user to add that type of image on his/her homepage, a social networking website, a blogging website, or a dating website. As another example, a user who prepares a professional/work presentation may want to include their photograph to accompany a description of his/her professional background.

Ideally, a user would recognize in what context an image is to be included. For example, a user should consider that an image suitable for posting on a dating website may not be appropriate for use on a professional blogging website. Unfortunately, this may not always be the case, and some users will include unsuitable images in various files by failing to recognize or appreciate the nature of a file or even simply by mistake.

To illustrate, consider examples of portraits used by two fictitious college professors, as shown in FIGS. 1A-2B. FIGS. 1A-B show two instances in which a college professor named Mary Smith included her portrait to accompany an online biography of her educational and professional background on a professional web page. A portrait 10 shown in FIG. 1A is an example of an appropriate image given the professional nature of the web page. On the other hand, a portrait 12 shown in FIG. 1B is an example of what might be considered an inappropriate image for use on such web page. In particular, given the somewhat provocative nature of the image 12, that image would likely be more suitable to accompany a dating site profile, for instance. As a result, by including the image 12 on her professional page, Mary Smith may send to the public an unintended message regarding her professional expertise.

FIGS. 2A-B show two other instances in which a college professor named David Jones included his portrait in a communication announcing a lecture he is scheduled to give. A portrait 20 shown in FIG. 2A is an example of an appropriate image considering the professional nature of the communication. On the other hand, a portrait 22 shown in FIG. 2B is an example of what might be considered an inappropriate image for use with such communication. Again, as in the case shown in FIGS. 1A-1B, the image 22 would be more suitable for use with a dating site profile, for instance.

As can be seen from the above examples, an appropriate image may add impact to the content of a file in which the image is included. On the other hand, an inappropriate image may be problematic. For example, an inappropriate image may convey a wrong message regarding a person's professional background and/or personal character. In some instances, it may also cause a personal embarrassment.

Therefore, what is a needed is a tool that can help users with a selection of images that are appropriate in the context of a file in which the images are to be included.

SUMMARY

In light of the above, the present disclosure provides a way to guide a user to select an image that is appropriate for inclusion in a given file based on a category of that file.

More specifically, in one aspect, a disclosed image managing method involves determining a category of a file being edited by a user in response to a user action indicating an intent to include in the file an image associated with an entity. The method further involves presenting, based on the category of the file, predetermined images associated with the entity for user selection of the image to be included in the file.

In another aspect, a disclosed image managing method involves determining a category of a file being edited by a user in response to a user action indicating an intent to include in the file an image associated with an entity. The method then involves determining whether a given image that the user intends to include in the file is associated with the category of the file. If the given image is associated with a category different than the category of the file, the method further involves providing a message that warns the user that the given image may be inappropriate for use with the file based on the category of the file.

In the disclosed methods, as one example, the entity may be the user and the image associated with the entity may include an image of the user. The file, on the other hand, may be a web page, a word processor document, a slide presentation, or another type of file in which the image associated with the entity may be included.

These as well as other aspects, advantages, and alternatives will become apparent to those of ordinary skill in the art by reading the following detailed description with reference where appropriate to the accompanying drawings.

BRIEF DESCRIPTION OF THE DRAWINGS

FIG. 3 illustrates an example of a network arrangement, including an image managing system, in which an embodiment of the present disclosure may be employed;

FIG. 4A is a block diagram of a prior workflow associated with a process of inserting an image into a file.

FIG. 4B is a block diagram of a workflow associated with a process of inserting an image into a file, in accordance with embodiments of the present disclosure.

DETAILED DESCRIPTION

Figure 1A:
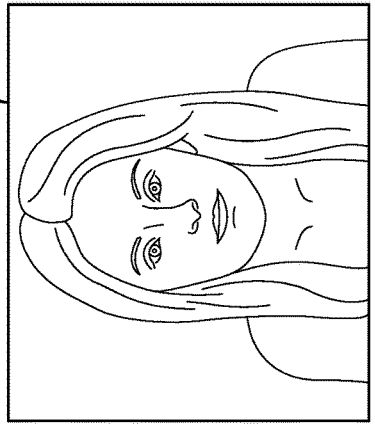
FIG. 1A illustrates one example of an image of user included on a professional web page.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

FIG. 3 illustrates an example of a network arrangement 30 in which an embodiment of the present disclosure may be employed. As illustrated in FIG. 3, the network arrangement 30 includes a user device 32 and a server 34 that are coupled together via a network 36. Accordingly, the user device 32 and the server 34 may communicate with each other over the network 36. As further shown in FIG. 3, an image managing system 38 may reside on the user device 32. However, instead of or in addition to, it may be possible for the image managing system 38 to reside on the server 34.

In general, the user device 32 may be any suitable device, some examples of which include a personal computer, a mobile computer (e.g., a laptop), and a handheld mobile device (e.g. a mobile/cellular phone (e.g., a smart phone) or a personal digital assistant (PDA)). The user device 32 is preferably equipped with suitable user interface(s) (e.g., a keypad, a keyboard, touch screen, mouse, a microphone, a display, etc.) to facilitate interaction with the user and the image managing system 38.

Network 36 may be any type of a network suitable for carrying communications between the user device 32 and the server 34, such as a wireless network, a landline network, or a combination of wireless and landline network(s). Additionally, the network 32 may be a private network (e.g., a wireless carrier's network, a landline and/or wireless local area network (LAN), wide area network (WAN), etc.). Although not shown, the network 40 will typically include any suitable network elements and/or interfaces to facilitate communication between entities coupled via the network 36.

The user device 32 may be configured with a number of application programs (not shown) that allow a user of the user device 32 to create or modify a file in which the user can include an image. Examples of such application programs include a word processor application (e.g., Microsoft Word®), a presentation application (e.g., Microsoft PowerPoint®), and/or a web browser application (e.g., Internet Explorer®, Safari®, Chrome®, or Firefox®). Accordingly, the file may be a word processor document, a slide presentation, a web page, or any other type of a file in which an image may be included. Furthermore, the application programs may be stored locally on the user device or, alternatively, the application programs may be, e.g., hosted on the server 32 (e.g., an enterprise server) and be accessible to the user device 32.

In operation, when the user is editing a file, i.e., creating a new file or modifying a previously created file, the user may want to include in the file an image. For example, if the user is creating a presentation using Microsoft PowerPoint application, the user may wish to include his or her digital portrait along with other content of the presentation. Similarly, if the user is editing a web page served by the server 34 (e.g., editing an online profile, blog, post, message, etc.) using a web browser application, the user may want to upload onto the web page a digital photograph showing the user. However, as discussed above, the user may not always include an image that is suitable/appropriate in the context of the file being edited. Further, currently, the user may not have any tool to guide the user to choose an image that is appropriate.

To illustrate, FIG. 4A is block diagram of an example of a prior art workflow 40 associated with a process of inserting an image into a file. As shown in FIG. 4A, at block 42, a file is being edited using a corresponding application program. For example, a user may be editing a web page using a web browser. At block 44, the user may invoke an option to add an image indicating a user's intent to include the image in the file. By selecting that option, at block 46, the user may navigate to a storage location, such as an image folder (e.g., a photo folder) where user's images are stored. After the user selects the image from the image folder, at block 48, the user may continue to complete editing of the file.

Hence, in accordance with the workflow 40, the user may access any and all folders, and select an image from those folders. As such, the user has no guidance as to which image may be suitable to be included in the file given the nature of the file. Thus, the user will likely rely on his or her own judgment in making the selection. Also, the prior system provides no safety mechanism to prevent the user from mistakenly navigating to a wrong storage location and selecting an unsuitable image.

In contrast, in accordance with embodiments of the present disclosure, the image managing system 38 provides an additional layer of functionality to assist the user with a selection of an appropriate image to be included in the file.

More specifically, FIG. 4B shows an improved workflow 50 associated with a process of inserting an image into a file, in accordance with one example embodiment. As shown, in place of the block 46 allowing a user to select any image, the workflow 50 instead includes a block 52 at which image managing functions are performed to assist the user in selection of an appropriate image to be included in the file.

More particularly, in one aspect of the present disclosure, when a user is editing a file and intends to include in that file an image associated with an entity, such as the user, the image managing system 38 may first determine a category of that file. Based on the category of the file, the image managing system 38 may then present to the user predetermined images associated with the user from which the user is to select the image to be included in the file. As such, the image managing system 38 may guide the user to select only those images that are appropriate in the context of that file.

In another aspect of the present disclosure, the image managing system 38 may also consider the category of the file to provide a warning to the user when the user intends to include in the file a given image associated with, e.g., the user that is inconsistent with the category of that file. Namely, if the given image is associated with a category different than the category of the file, the image managing system 38 may provide to the user a message that warns the user that the image may be inappropriate for use with the file based on the category of the file. As a result, the user may select a different image that is more appropriate in the context of the file being edited.

Preferably, the image managing system 38 is integrated with an application program used to edit a file, such that the image managing functions can be invoked directly from the application program. Hence, depending on whether such application resides directly on the user device 32 or another network entity, such as the server 34, the image managing system 38 may reside in the same place as well.

2. Image Selection Functionality

Figure 5:
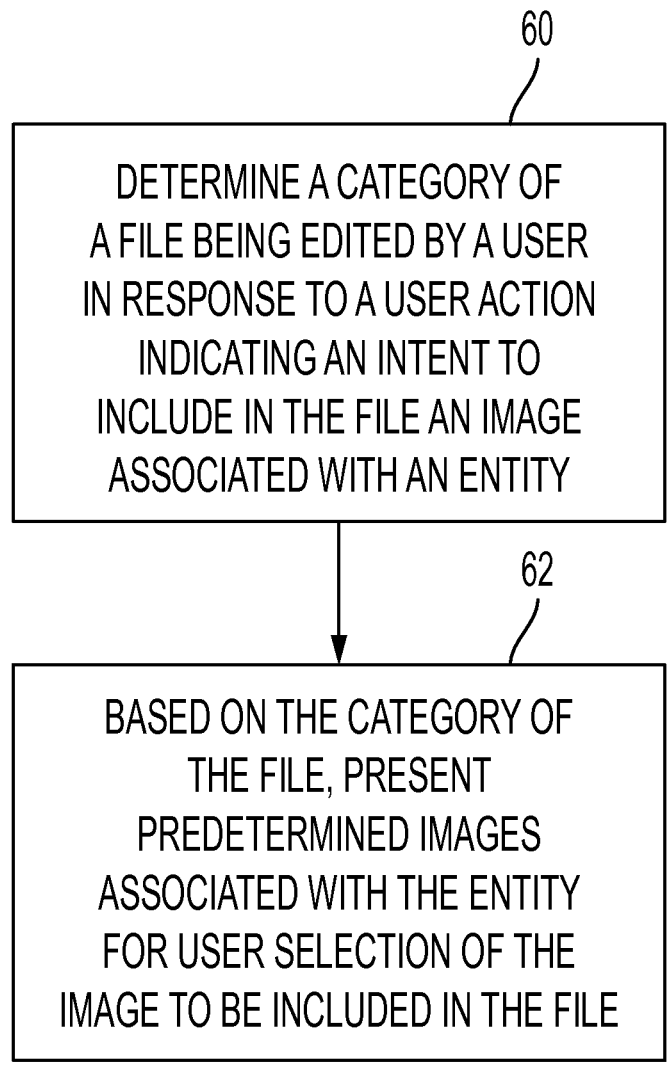
FIG. 5 is a flow chart of one embodiment of an example set of functions that could be carried out by the image managing system in the arrangement of FIG. 3.

FIG. 5 is a flow chart summarizing an example set of functions that could be carried out by the image managing system 38 in the arrangement of FIG. 3, for instance, in accordance with one aspect of the present disclosure. The image managing system 38 may comprise a processing system (e.g., implemented in the form of processor(s) and program instructions stored in memory) that could be configured to carry out such set of functions.

As shown in FIG. 5, at step 60, the image managing system 38 determines a category of a file being edited by a user in response to a user action indicating intent to include in the file an image associated with an entity. Then, at step 62, based on the category of the file, the image managing system 38 presents predetermined images associated with the entity for user selection of the image to be included in the file.

As used herein, the entity may be the user or another entity, such as a person or a group of people. As one example, one user may wish to include in the file an image associated with another user (e.g., a company creating a website on behalf of another entity).

Further, an image associated with the entity may refer to an image including an image of the entity or, generally, an image having any sort of association with the entity (e.g., an image under a control of the entity, such as an image stored in a storage location managed by the entity (e.g., a user) or an image belonging to the entity). Additionally, as used herein, an "image" not only refers to a single static image but also includes a set of images, such as a video clip.

Yet further, the term "predetermined images" refers to both the case in which one or more predetermined images exist and the case in which no predetermined image exists.

The process depicted in FIG. 5 will be now described in more detail. As noted above, when a user is editing a file, the user may want to include in the file an image associated with an entity, such as the user. In one example, the image could be a digital photograph including an image of the user, such as a digital portrait of the user.

Figure 1B:
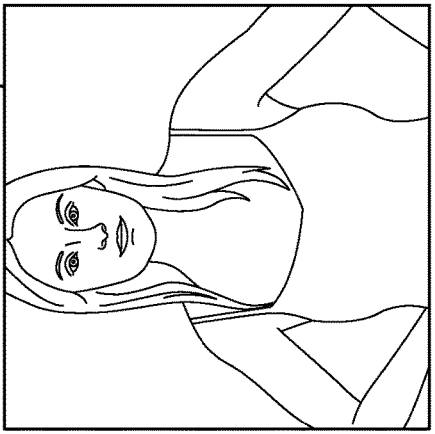
FIG. 1B illustrates another example of an image of the user included on the professional web page of FIG. 1A.
Figure 2A:
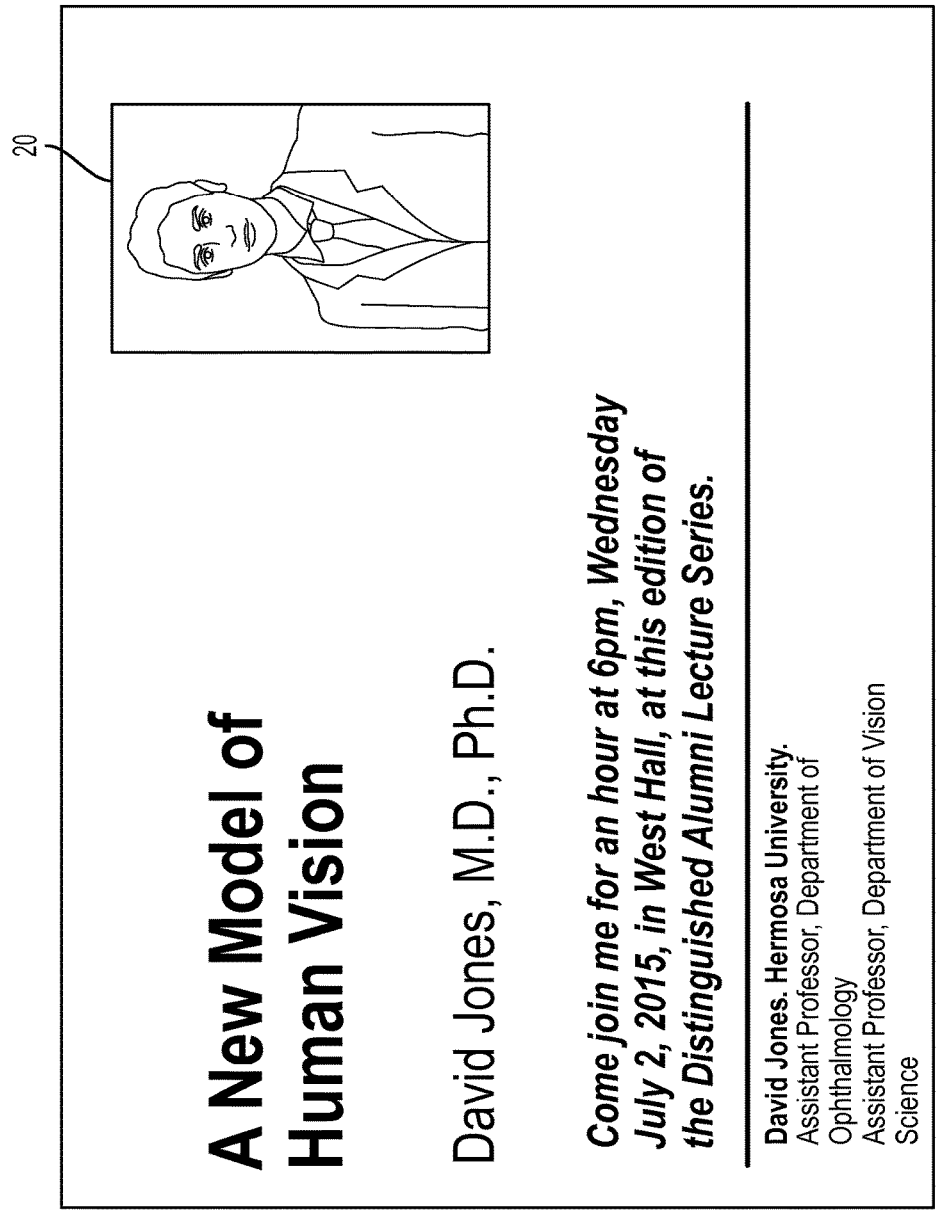
FIG. 2A illustrates one example of an image of a user included on a professional communication.
Figure 2B:
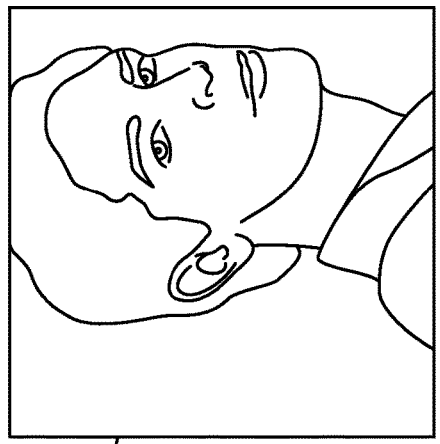
FIG. 2B illustrates another example of an image of the user included on the professional communication of FIG. 2A.
Figure 6A:
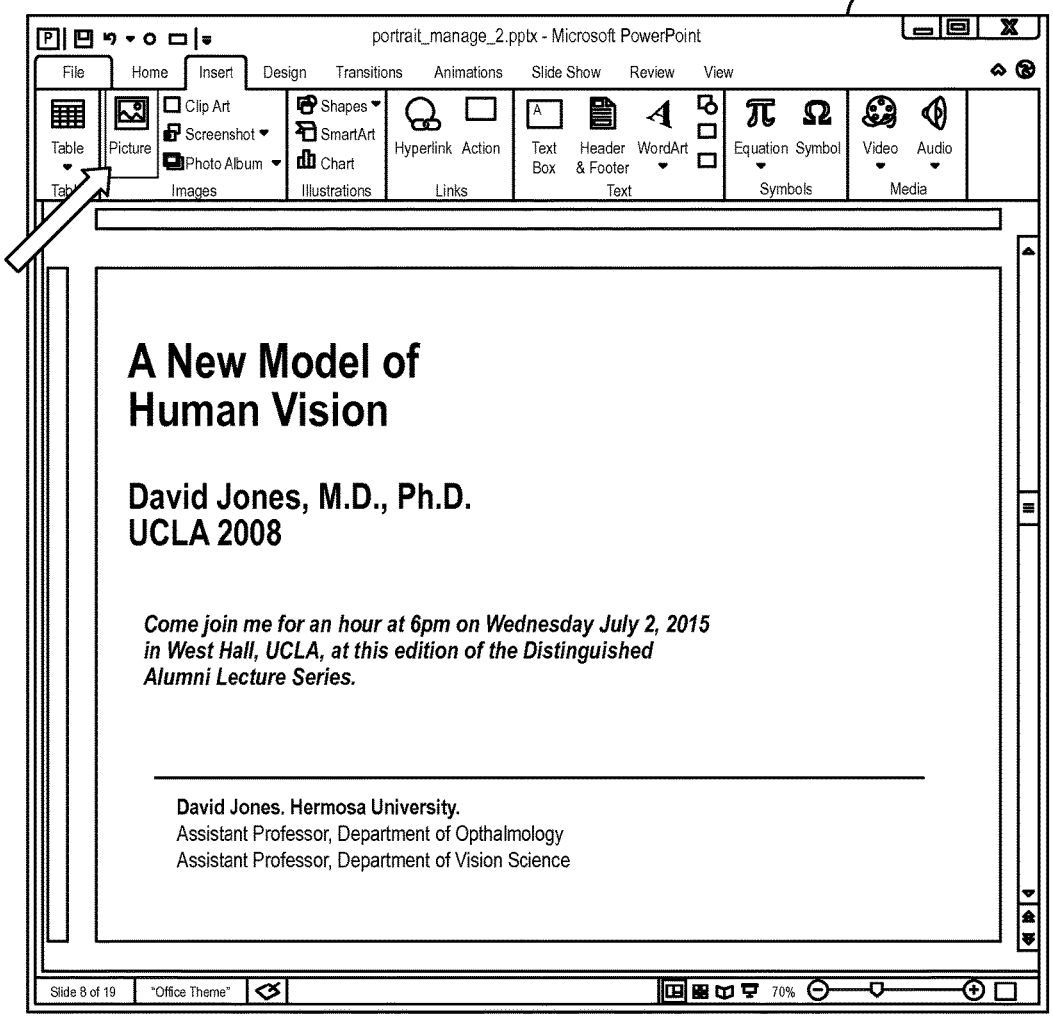
FIG. 6A shows an example in which a user is editing a presentation.
Figure 7A:
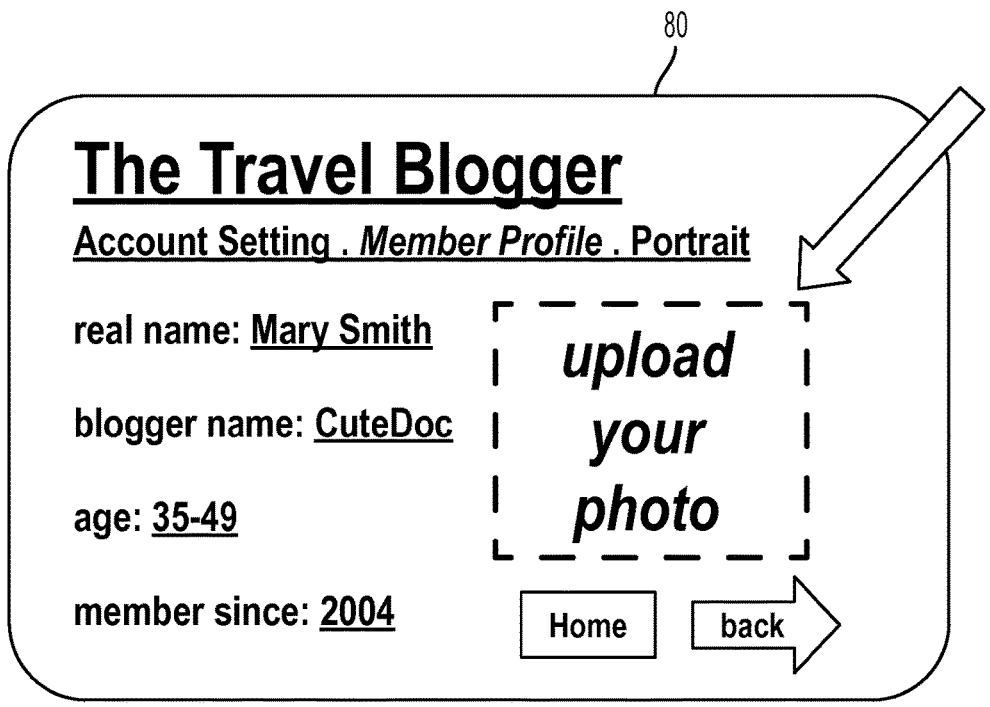
FIG. 7A shows an example in which a user is editing a web page.

Consider the previously described example in connection with FIGS. 2A-2B, in which a user named David Jones included his portrait in a communication announcing a lecture he is scheduled to give. FIG. 6A shows this user (hereafter referred to as "user A") creating a presentation 70 using Microsoft PowerPoint application. FIG. 7A then shows another example, in which another user (hereafter referred to as "user B") (e.g., Mary Smith described in connection with FIGS. 1A-1B) is editing a member profile web page 80 associated with a travel-blogging website.

Generally, during editing of a file, a user may take an action indicating that the user intends to include in the file an image associated with the user. Such action could be clicking on any suitable tab, soft button, or the like, that would allow the user to navigate to a storage location from which the user could retrieve the image. As shown in the example of FIG. 6A, in the presentation 70 created using the Microsoft PowerPoint application, the user A selects the "Picture" tab which would allow the user to navigate to images stored in the user's storage locations, such as in "Documents" folder and any sub-folders. Similarly, as shown in the example of FIG. 7A, during the course of editing the web page 80 using a web browser, the user B may click a soft button within the web page 80 allowing the user B to upload a desired image onto the web page 80.

In accordance with the process shown in FIG. 5, the image managing system 38 first determines a category of a file being edited by a user in response to a user action indicating intent to include in the file an image associated with an entity.

In one embodiment, the image managing system 38 may determine the category of the file by requesting the user to select a given category from a number of predetermined categories. To illustrate, as shown in FIGS. 6B and 7B, a user may be presented with a graphical user interface (GUI) (i.e., a GUI 72 in FIG. 6B and a GUI 82 in FIG. 7B) that lists multiple predetermined categories and requests the user to select one of those categories by providing a corresponding input (e.g., selecting/checking a box associated with the given category).

Figure 6B:
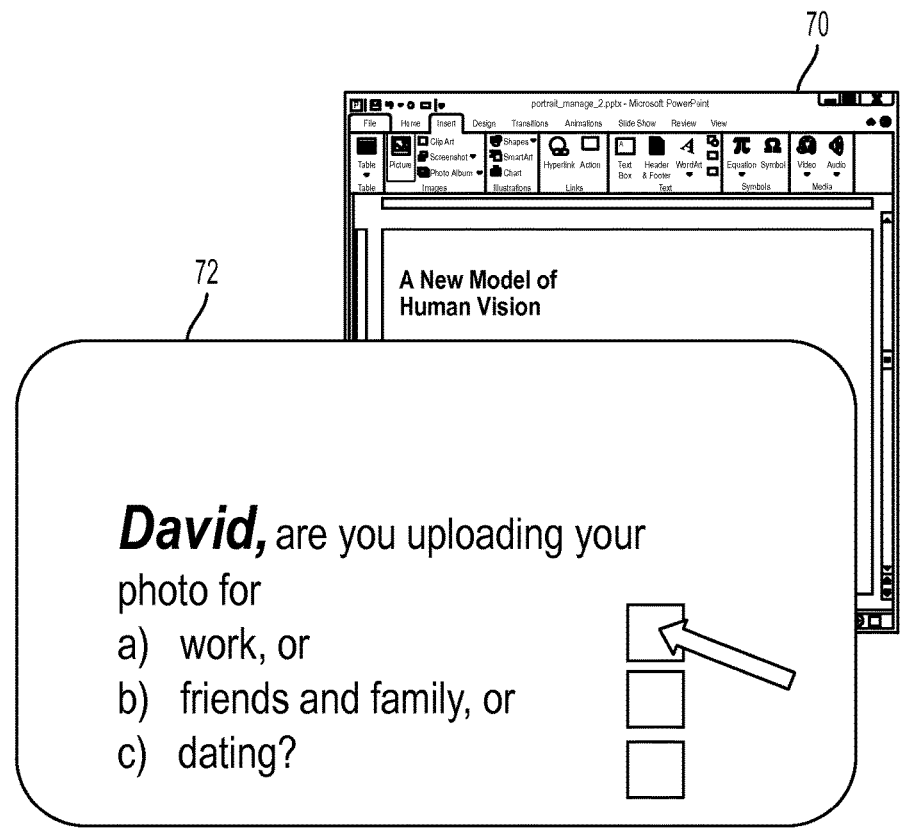
FIG. 6B shows a graphical user interface for category selection presented to the user of the example of FIG. 6A.
Figure 7B:
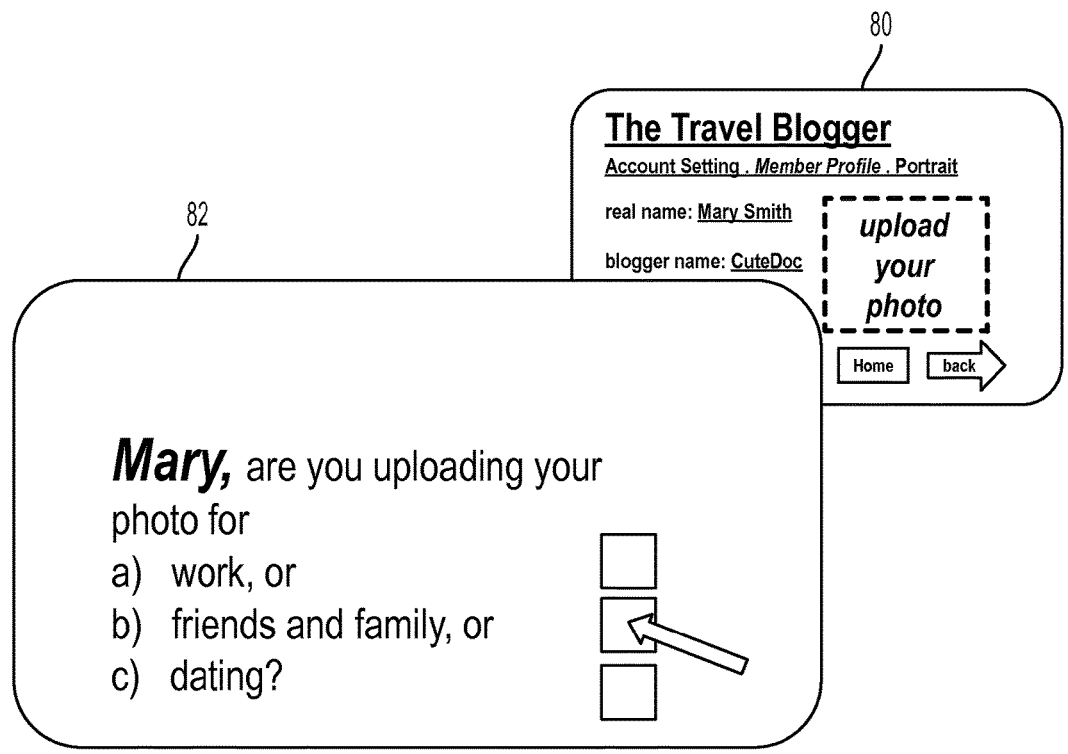
FIG. 7B shows a graphical user interface for category selection presented to the user of the example of FIG. 7A.

In the examples of FIGS. 6B and 7B, the predetermined categories are a "work" category, a "friends and family" category, and a "dating" category. However, in other examples, those categories may be different or may be termed differently (e.g., a "professional" category, a "social" category, and/or "romance" category). Accordingly, in FIG. 6B, the user A may select a "work" category for the work-related presentation. In FIG. 7B, the user B may select, for instance, a "friends and family" category for her travel-blogging profile page to be shared with other blog readers.

In another embodiment, the image managing system 38 may determine the category of the file in an automated fashion, without requiring an input from the user. As one example, content of websites may be categorized (automatically or manually) and information regarding the same stored in a database. The database may contain a list of website addresses (e.g., URLs) and/or website names (e.g., "Facebook," "match.com," etc.) in association with corresponding categories.

For example, a website for an online dating service, such as match.com® may be categorized as a dating website and associated with a "dating" category. On the other hand, a website for a social networking service, such as Facebook®, may be categorized as a social website and associated with a "friends and family" category. Similarly, a website for a travel blogging service, such as the "Travel Blogger" as shown in FIG. 7A, may be categorized as a social website and associated with a "friends and family" category as well. Note, however, that categorizations may be even more granular to categorize, for example, particular web pages within given websites.

As such, in order to determine a category of a web-based file such as a web page, the image managing system 38 may be configured to detect information identifying the web page (e.g., a URL of the web page or a corresponding website) and determine its category by referencing the database. For example, in connection with the example of FIG. 7A, the image managing system 38 may determine a category of the user's profile page based on a category of the "Travel Blogger" website. The image managing system 38 may detect the web page identifying information directly via the web browser application or by sending a query to a suitable network entity.

Note that some web pages/websites may be classified as belonging to more than one category. In such case, the image managing system 38 may be further configured to ask a user to select one category from among those categories. Also, in one alternative embodiment, rather than referencing a predefined database, the image managing system 38 may be also configured to perform a dynamic check on a category of a web page by sending a query to a network entity that can categorize different websites. In yet another embodiment, any web page/website whose category cannot be determined based on the information in the predefined database may be added to the database by requesting a user to categorize the web page/website.

In yet another embodiment, it may be possible to configure the image managing system 38 to determine a category based on a content of a file. In this regard, the image managing system 38 could parse the content and, based on the parsed content, provide to the user a list of one or more predetermined categories. This embodiment may be particularly applicable to non-web text-based files, such as documents created using a word processor application, slide presentations, etc.

In accordance with the process of FIG. 5, once the category of the file has been determined, the image managing system 38 then presents predetermined images associated with the entity for user selection of the image to be included in the file based on that category.

Figure 6C:
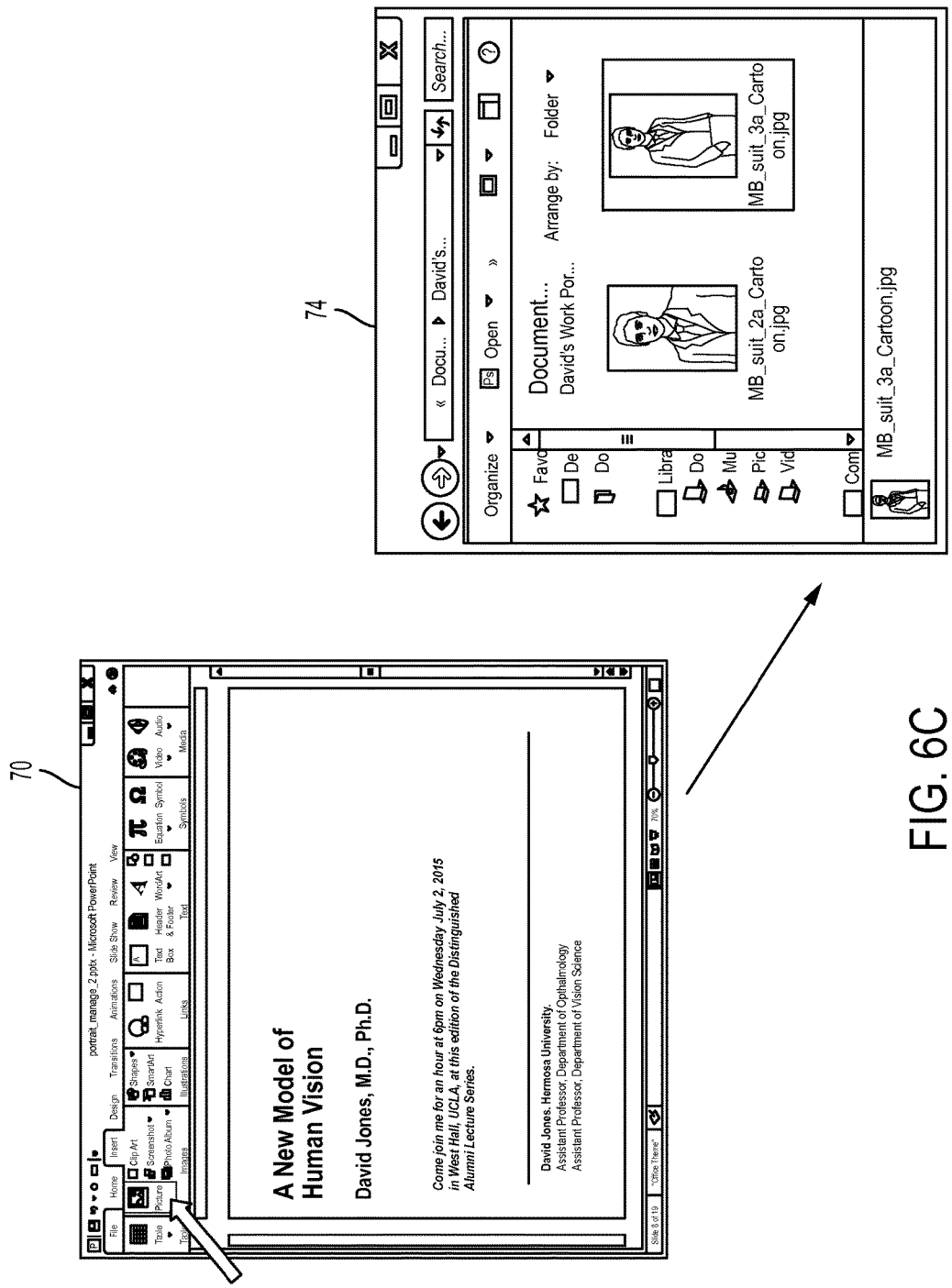
FIG. 6C shows an example of a folder associated with a file category being presented to the user of the example of FIG. 6A.

To illustrate, in the example of FIG. 6C, the image managing system 38 may determine that a category of the presentation being edited by the user A is a "work" category. Accordingly, based on that category, the image managing system 38 causes a folder 74 storing only work-related portrait images of the user A to be presented to that user. Similarly, in connection with the example of FIG. 7B, the image managing system 38 may determine that a category of the web page 80 being edited by the user B is a "friends and family" category. Although not illustrated, based on that category, the image managing system 38 may cause a folder storing only social networking/media-related images of the user B to be presented to that user.

As illustrated in the above examples, in one embodiment, the image managing system 38 may present only predetermined images associated with the entity for user selection of the image to be included in the file. However, in other embodiments, the image managing system 38 may present to the user other images in addition to the predetermined images. In this regard, it is possible that only the predetermined images will be available for user selection so that the user can select the image to be included in the file only from those predetermined images. For example, the other images may be formatted such that that they cannot be selected by the user (e.g., grayed out). It is also possible to present the other images in a manner that differentiates them from the predetermined images (e.g., the other images may be displayed in a different color) while emphasizing the predetermined images provided for user selection.

Figure 8:
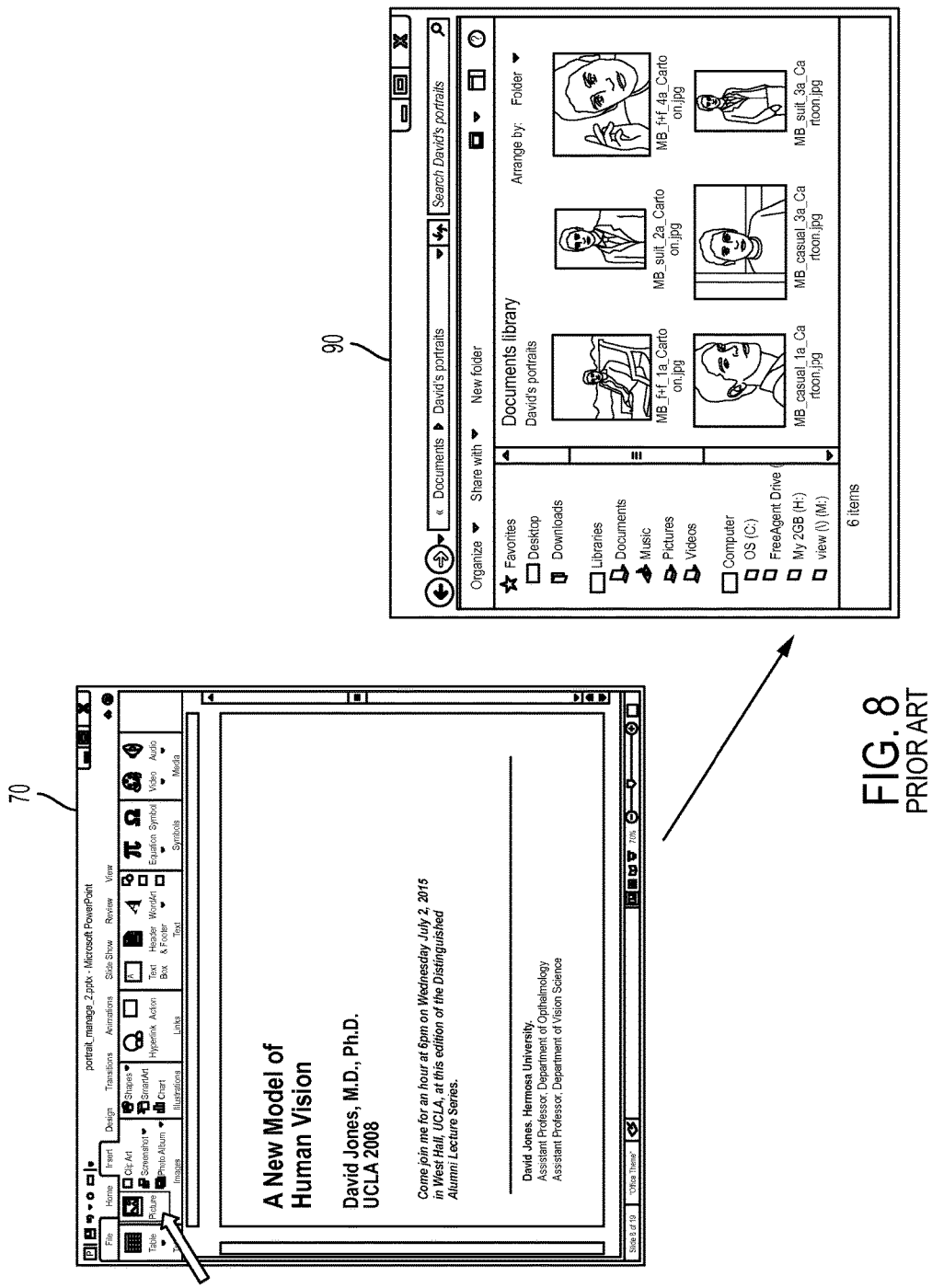
FIG. 8 illustrates one example of a prior image selection process.
Figure 9:
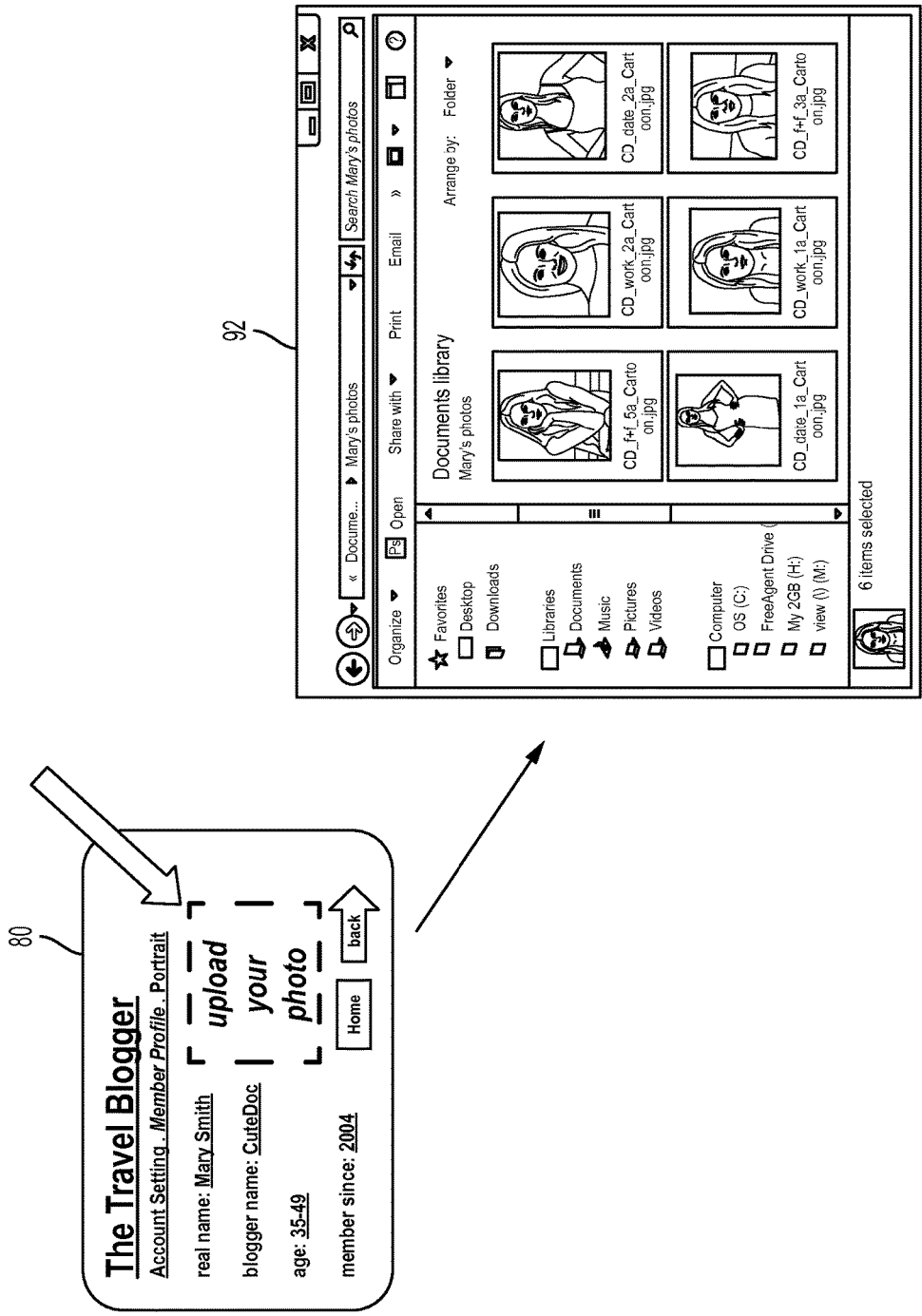
FIG. 9 illustrates another example of a prior image selection process.

In the prior art image selection process, when a user wants to insert or upload an image into a file, the user may be directed to any and all possible image storage locations from which the user can retrieve the image. For example, as shown in FIG. 8, the user A is able to select any image from a folder 90 storing all portraits of the user A (e.g., "David's portraits"). Similarly, as shown in FIG. 9, the user B is able to select any image from a folder 92 storing all photos of the user A (e.g., "Mary's photos"). Hence, such users may select images that may be inappropriate for the file in which they are to be included.

In contrast, with a benefit of the above-described process, a user can be guided to select only those images that are likely to be suitable in the context of a particular file. For example, as shown in FIG. 6C, rather than presenting all portraits of the user A, the image managing system 38 provides only work-suitable portraits for selection of an image to be included in the user A's professional presentation.

In the above examples, in order to present to the user the predetermined images, the image managing system 38 may access one of data storage locations, such as folders for instance, that are each associated with a corresponding category. Each folder may be configured in advance, either manually or automatically, to store images associated with the user, and classified as belonging to the corresponding category. Once the image managing system 38 determines a category of a file being edited by the user, the image managing system 38 can retrieve those images (or details associated with those images, such as filenames or thumbnails) that are stored in a particular folder associated with that category.

Figure 10:
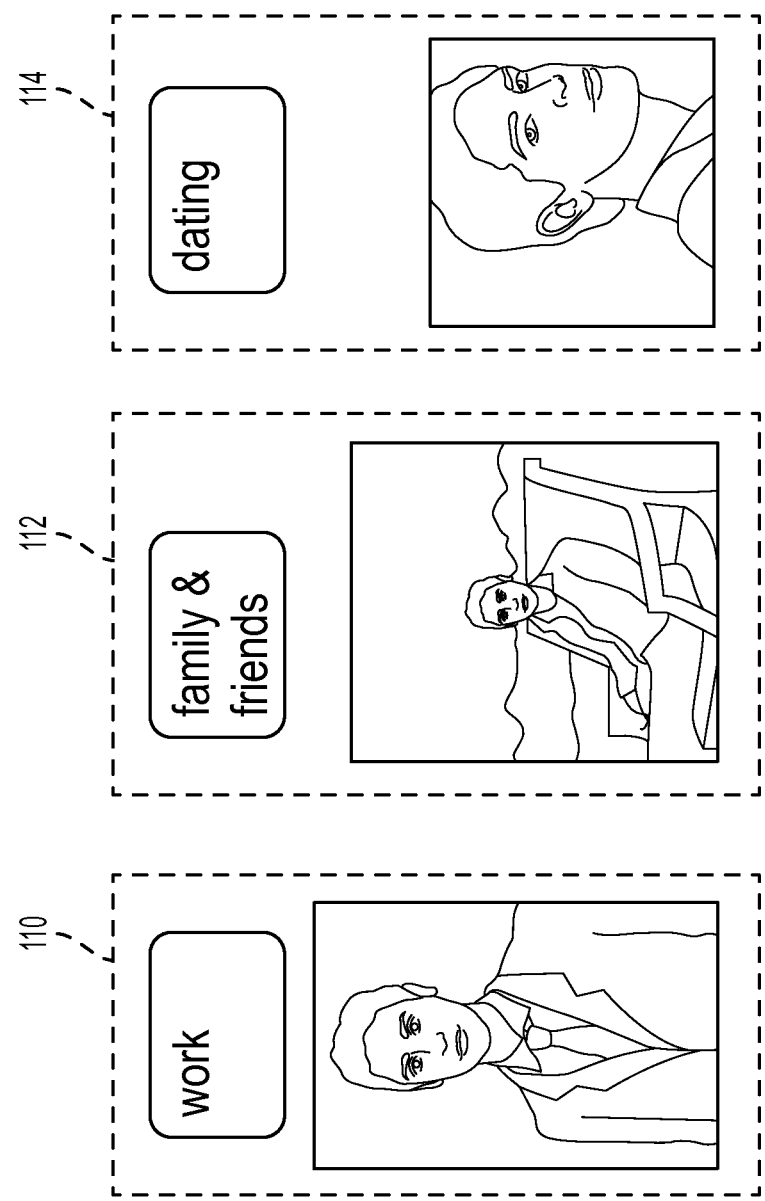
FIG. 10 illustrate how images may be classified into a number of categories and stored in associated folders for one user, in accordance with one embodiment of the present disclosure.
Figure 11:
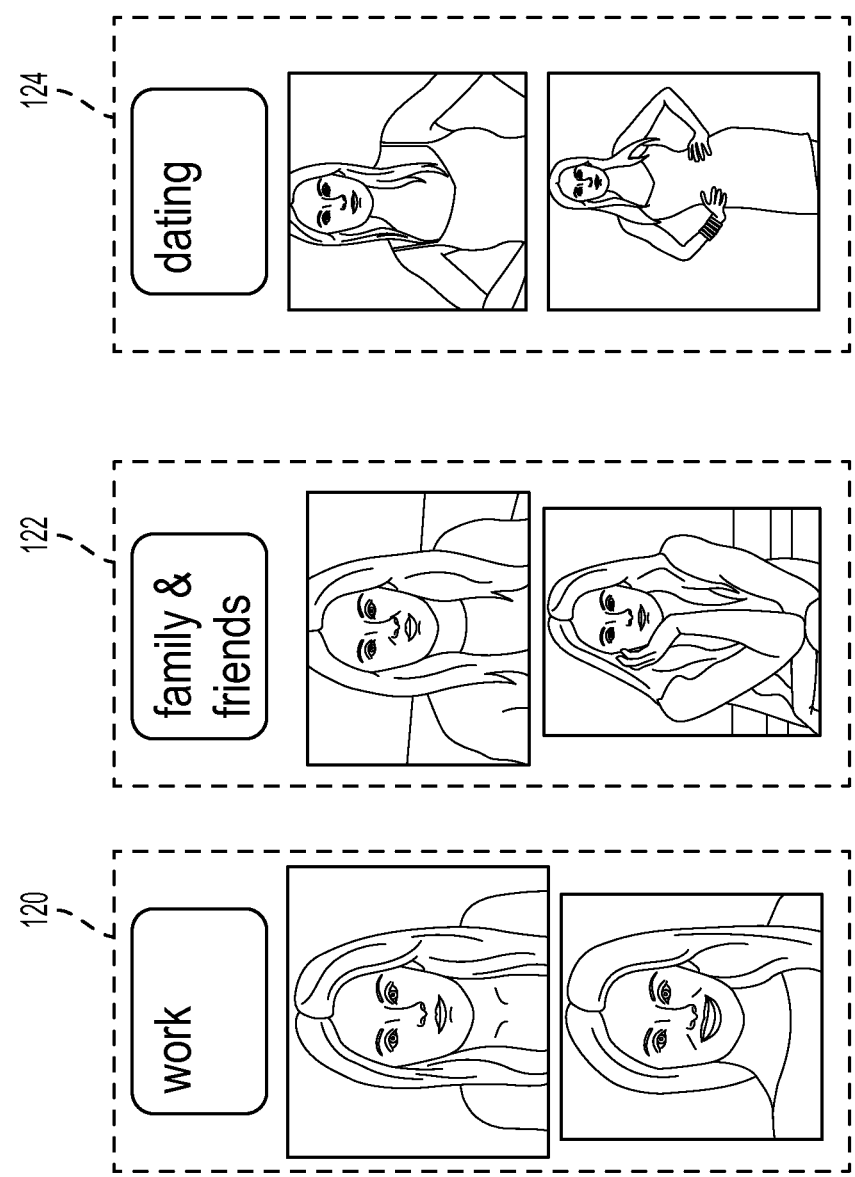
FIG. 11 illustrate how images may be classified into a number of categories and stored in associated folders for another user, in accordance with one embodiment of the present disclosure.

FIGS. 10 and 11 illustrate how images may be classified into a number of categories and stored in associated folders 110-114 for the user A and folders 120-124 for the user B, respectively.

As noted above, in one embodiment, such folders may be pre-configured manually. In one example, categories and corresponding folders associated with those categories may be preset in the image managing system 38. During an initial system configuration, the image managing system 38 may ask a user to organize the user's images according to those categories, such as by placing the images into folders associated with corresponding categories. In this regard, each preset folder may have a name indicative of a corresponding category and the user can store respective images judged to belong to that category into a respectively named folder.

As another example, the image managing system 38 may be configured accordingly to allow the user to manually organize the user's images according to user-determined categories and store them in corresponding folders. The image managing system 38 could, in turn, be arranged to recognize those categories, such as by parsing folder names (e.g., "David's Work Portraits") and/or extensions of files stored in a given folder (e.g., "David's Portrait A_work.jpg") and detecting key words indicating a given category. For example, the image managing system 38 could further be configured with logic to correlate a user-named category with some predetermined categories (e.g., predetermined in advance or determined via an automatic process as in the case of web pages). Such logic could be configured to detect exact matches or not in the event those categories do not exactly match the predetermined categories recognized by the system. Other examples may be possible as well.

In another embodiment, the folders may be pre-configured automatically. As an example, the image managing system 38 may be configured with one of the automatic portrait classification tools and/or other type of image recognition technology, now existing or later developed, that could be used to classify images into different categories (e.g., based on the features depicted in the images) and, e.g., store them in corresponding storage locations. For example, for classifying profile images, one of such tools is a tool developed by Filippo Mazza et. al. and described in a presentation titled "What do you think of my picture? Investigating factors of influence in profile images context perception" presented at the 2015 SPIE/IS&T Electronic Imaging Conference, a summary of which may be found at www.spie.org/Documents/ConferencesExhibitions/EI15-Abstracts.pdf. As a general matter, this tool relies on a set of features (e.g., a dress topology) to classify portrait images into categories.

The image managing system 38 may be configured to initially perform automatic category classification on a selected group of storage locations where images associated with a user (or another entity) are held. In this regard, as a part of initial configuration, the image managing system 38 may give a user an option to indicate those storage locations.

Note, however, that other ways of categorizing images associated with an entity may also be possible. Also note that a given image may be classified as belonging to more than one category. For example, an image appropriate for posting on a professional web page may likely also be suitable for use on social media sites.

In some alternative embodiments, some optional safety features may be provided. For example, access to one or more folders storing corresponding images may require a password. As an example, user's images classified as belonging to a dating category may require a password to protect a privacy of the user. Accordingly, before the image managing system 38 is able to retrieve an image from such folder, the image managing system 38 may query the user for the password to access that folder.

As another optional feature, image(s) stored in particular folder(s) may be watermarked to control contamination and other type of corruption. Such watermarking may be "invisible" and is available, for example, from Digimarc Corp. Accordingly, the image managing system 38 may be configured accordingly to detect a watermark in a particular image (e.g., a work-categorized image or a dating-categorized image) to verify the authenticity of the particular image prior to providing that image to the user for inclusion in a file.

3. Warning Functionality

In some embodiments, the image managing system 38 may also provide a warning function that, generally, could remind a user of the nature of a file and warn the user if a given image that the user intends to include in the file does not match the nature of the file. In this regard, the image managing system 38 could consider a category of a file as a basis for issuing a warning to the user when the given image chosen by the user does not correspond to the category of the file.

Figure 12:
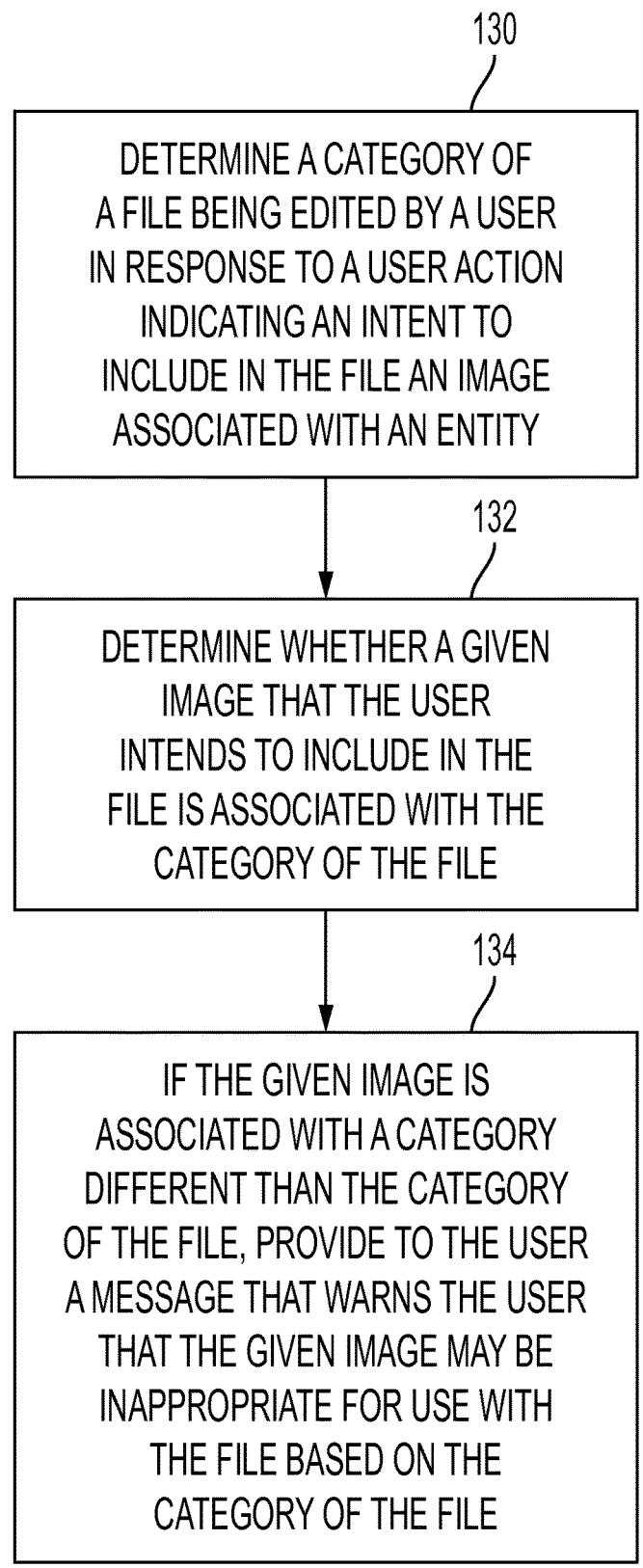
FIG. 12 is a flow chart of another embodiment of an example set of functions that could be carried out by the image managing system in the arrangement of FIG. 3.

FIG. 12 is a flow chart generally summarizing an example set of functions that could be carried out by the image managing system 38 in the arrangement of FIG. 3, for instance, in accordance with another aspect of the present disclosure.

As shown in FIG. 12, at step 130, the image managing system 38 determines a category of a file being edited by a user in response to a user action indicating intent to include in the file an image associated with an entity. Then, at step 132, the image managing system 38 determines whether a given image that the user intends to include in the file is associated with the category of the file. If the given image is associated with a category different than the category of the file, at step 134, the image managing system 38 provides to the user a message warning the user that the given image may be inappropriate for use with the file based on the category of the file.

In general, the step 130 may be carried out using the same or similar principles as those described above with respect to the process described in connection with FIG. 5. For example, as described above, the image managing system 38 may determine the category of the file by requesting an input from the user or through an automatic process, such as in the case of web-based files. Thereafter, the image managing system 38 determines whether the given image that the user intends to include in the file is associated with the category of the file.

As described above, in one embodiment, images associated with the user may be stored in folders associated with corresponding categories. As such, once the user provides an indication to select an image from a folder associated with a particular category (e.g., the user navigates to a folder associated with the particular category, clicks on an image in that folder, and/or the like), the image managing system 38 may determine whether the image is associated with the category of the file by determining whether the category associated with the folder storing the image corresponds to the category of the file. In this regard, the category of the folder may be one of the folder categories initially preset in the image managing system 38 and/or the image managing system 38 could be, for instance, arranged to recognize folder categories via folder names and/or file extensions. Other examples may be possible as well.

In another embodiment, to determine whether the given image that the user intends to include in the file is associated with the category of the file, the image managing system 38 may dynamically classify the given image, such as when the given image, e.g., has not been pre-classified into any particular category and stored in a corresponding folder. The image managing system 38 may dynamically classify the given image as belonging to a particular category by executing an automatic image classification, such as an automatic portrait classification noted above, and/or any other suitable image recognition process with respect to that given image.

Figure 13:
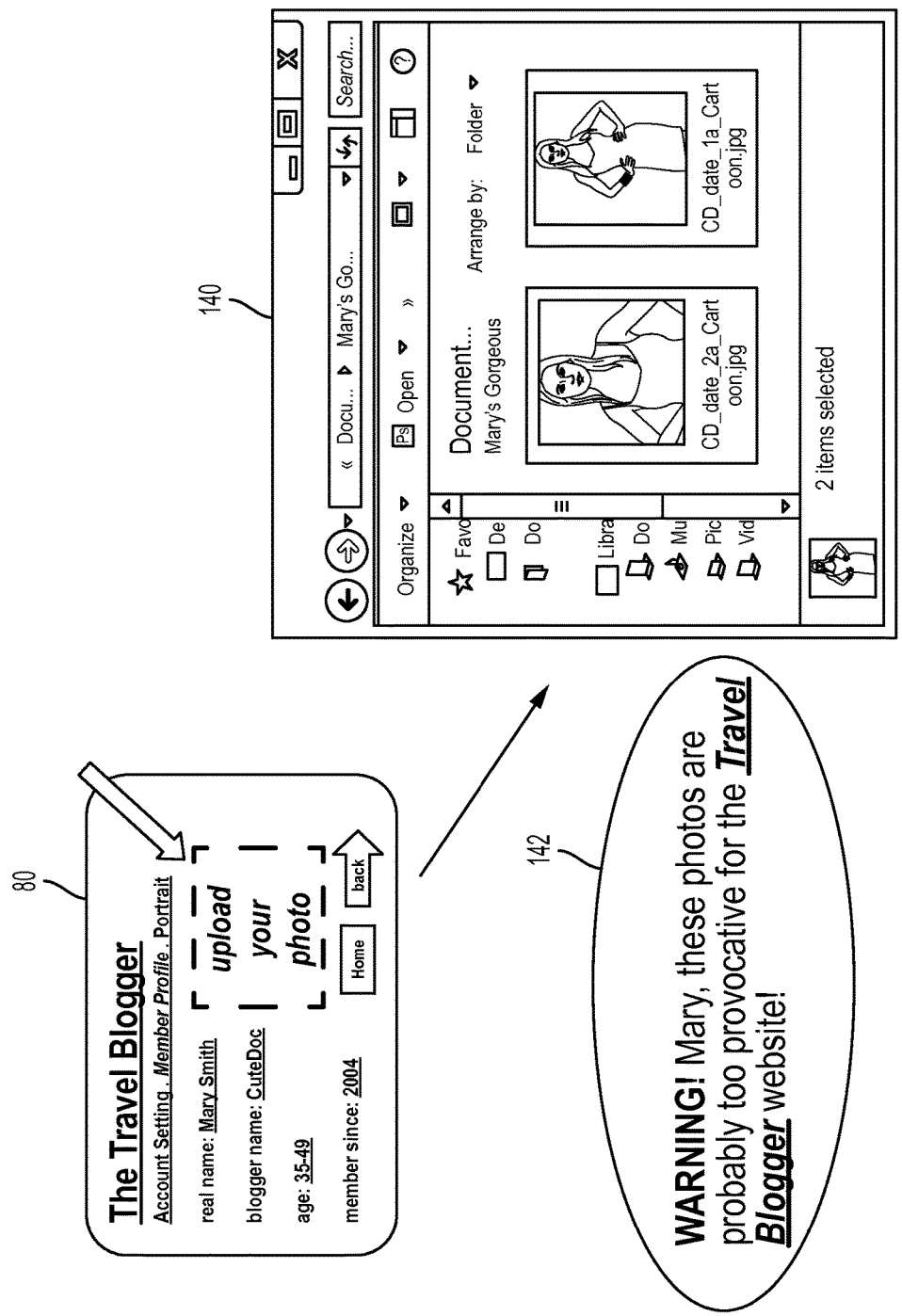
FIG. 13 shows a variation of the example shown in FIGS. 7A-B, illustrating a warning feature in accordance with the process of FIG. 12.

FIG. 13 shows a variation of the example shown in FIGS. 7A-B in which the user B is uploading her photograph to accompany her travel-blogging profile. As shown in FIG. 13, when the user B navigates to a folder 140 named "Mary's Gorgeous" storing images from which the user B intends to select an image to be included in her online profile, the image managing system 38 recognizes that an image that the user B intends to include is associated with a category different than the category of the travel-blogging web page. For example, the image managing system 38 may detect that the folder 140 is associated with a dating category.

Accordingly, the image managing system 38 shows the user B a message warning the user B that the photos in that folder may be inappropriate for use with the "Travel Blogger" web page that may be categorized as belonging to a "friends and family" category. On the other hand, if the image that the user B intended to include in her profile was associated with the same or similar category as the category of the web page, the image managing system 38 would allow the user B to proceed without warning with the upload of the image.

The warning feature of the image managing system 38 may be also be implemented in conjunction with the image selection function as described above.

Namely, in one embodiment, once the image managing system 38 presents a user with predetermined images from which the user is to select an image to be included in a file, the image managing system 38 may be configured such that the user will have an option to select an image other than the predetermined images. To illustrate, in the example of FIG. 6C, the user A may be given an option to override the choice of a folder provided by the image managing system 38. The user A can do so by, for example, closing the system-provided folder, and navigating/selecting an image from a different storage location for insertion into the file. For example, the user A may select a portrait image that would be more appropriate to accompany a dating profile.

In response to receiving from the user such or similar input indicating that the user A intends to include in the file an image other than the predetermined images, the image managing system 38 may warn the user that the user-selected image may be inappropriate for use with the file based on the category of the file (e.g., a "work" category). Accordingly, as in the example of FIG. 13, the image managing system 38 may generate a message warning the user A that the user-selected portrait may be inappropriate for a work presentation.

Advantageously, with the warning feature of the image managing system 38, users can be reminded of the context of a file and warned when their image choice (e.g., a portrait-like image) does not correspond to a category of a file in which the image is to be included.

4. System Architecture

Figure 14:
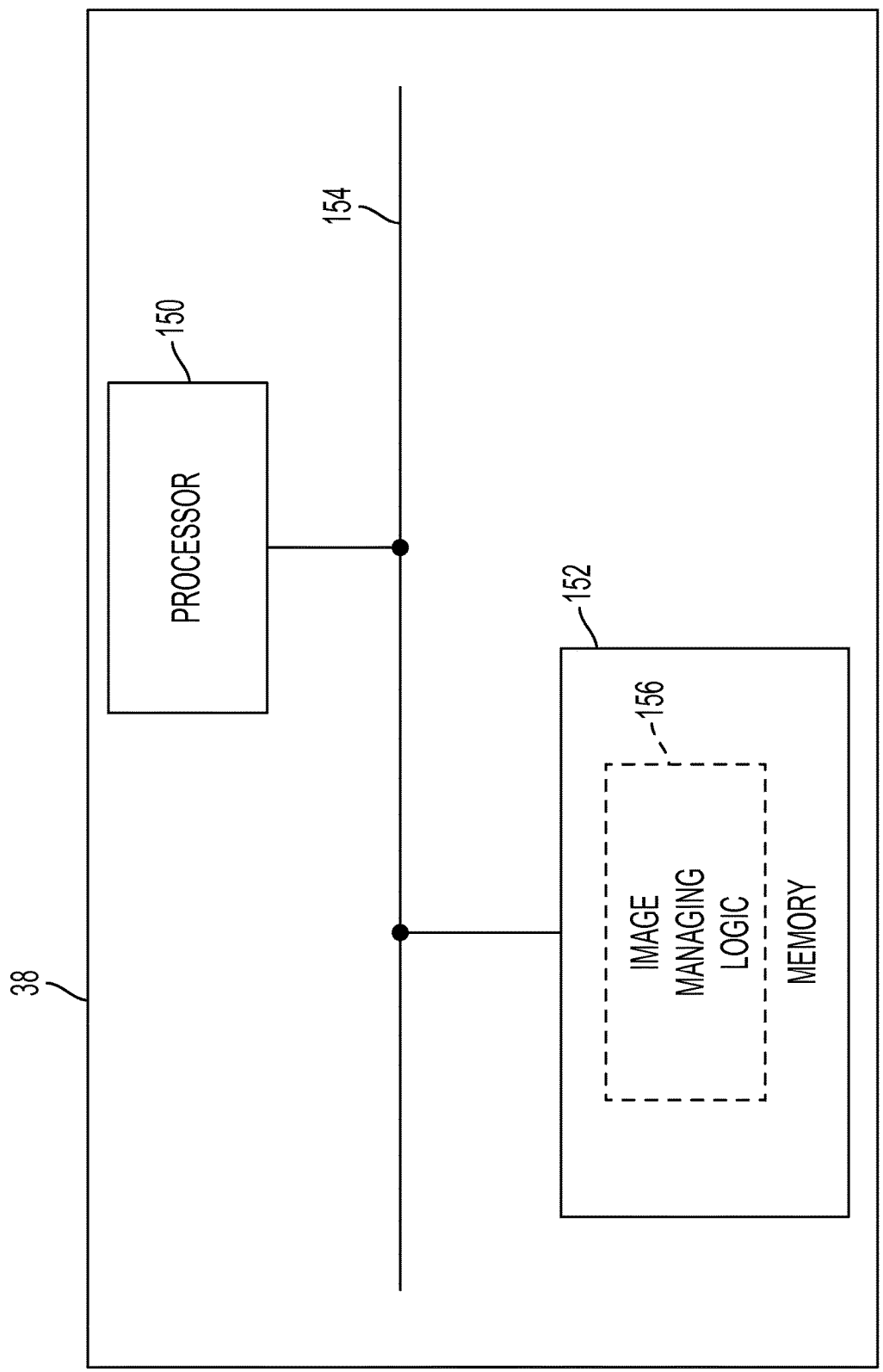
FIG. 14 is a block diagram of an image managing system arranged in accordance with embodiments of the present disclosure.

FIG. 14 illustrates the image managing system 38 of FIG. 1 in greater detail. As illustrated, image managing system 38 may include a processor 150 and memory 152, connected together via a system bus or other mechanism 154. Further, as shown in FIG. 14, the memory 152 includes image managing logic 156. However, this system arrangement is shown for purpose of example only, and the image managing system 38 may also include other components not shown in FIG. 14. As an example, the image managing system 38 may include a number of interfaces (e.g., a communication interface, input/output interface, etc.), e.g., for communicating with other entities and/or communicating data to/from the memory 152.

The processor 150 may be one or more central processing units (CPUs), general purpose processors, and/or dedicated processors (e.g., application specific integrated circuits (ASICs) or digital signal processors (DSPs). The memory 152 may be a non-transitory computer-readable medium, and can be a volatile and/or nonvolatile type of data storage.

Further, the memory 152 may store logic including program instructions (e.g., machine language instructions or any other higher-level programming instructions) executable by the processor 150 to carry out various functions described herein. In particular, the memory 152 may store the image managing logic 156 that includes program instructions for carrying out various functions of the image managing system 38, including image selection functionality and warning functionality as described above. The memory 152 can also store other data used by the program logic (e.g., a database, as described above, for automatic determination of a category of a web page).

As noted above, in some embodiments, the functionality of the image managing system 38 may be integrated with an application program used to edit a file in which an image is to be included. For example, the image managing logic 156 (and, e.g., any corresponding data used by the image managing logic 156) may be provided as an additional software layer integrated with other logic of the application program in order to extend functionality of the application program to include various functions of the image managing system 38, create custom GUI(s) (such the GUIs 72 and 82 described in connection with FIGS. 7A and 7B), etc.

As one example, Microsoft Office applications, such as Microsoft Word® and Microsoft PowerPoint®, may be modified with so-called "add-ins." An add-in is generally a program that can be added to another primary program, such as an application program. The add-in can, e.g., automate an application program, extend features of the application program, and/or customize the application user interface. An application-level add-in for Microsoft Office applications may be created using, e.g., Visual Basic for Applications (VBA) programming code and Visual Studio development tool.

Accordingly, for files edited using Microsoft Office applications, the image managing logic 156 (and, e.g., any corresponding data used by the image managing logic 156 can be implemented in the form of an add-in. Such add-in could, for example, be activated to run in the background of the Office application and be invoked when a user takes an action indicating that the user intends to include in the file an image.

As another example, web browsers often use extension-type programs that can extend the functionality of a web browser (e.g., adding feature(s) to a web browser) and can be invoked directly from the web browser application. Depending on the type of a web browser, these applications can be termed, e.g., as "extensions," "plug-ins," or "add-ons." To illustrate, Internet Explorer and Safari browsers typically use add-ons. On the other hand, Chrome and Firefox typically use extensions. Those types of programs can be written using, for example, Java script or HTML script (e.g., HTML5).

Accordingly, for files edited using web browser applications, the image managing logic 156 (and, e.g., any corresponding data used by the image managing logic 156 can be implemented in the form of a web browser extension/plug-in/add-on or the like.

It should be understood that the above examples are provided for purpose of example only and the image managing system 38 may be configured in other ways from those discussed above. In one alternative embodiment, it may be possible to implement the functionality of the image managing system 38 in the form of a standalone application program that could run separately from other application programs and interact with other application programs (e.g., via suitable call functions) to perform various functions described herein.

5. Conclusion

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A digital image managing method, comprising:
   determining, by at least one processor, a category of a file being edited by a user in response to a user action indicating an intent to include in the file a digital image associated with an entity, wherein the file is a web page, a word processor document, or a slide presentation; and
   based on the category of the file, presenting, by the at least one processor, predetermined digital images associated with the entity for user selection of the digital image to be included in the file.

2. The method of claim 1, wherein the entity is the user.

3. The method of claim 2, wherein the digital image associated with the entity is a digital photograph associated with the user.

4. The method of claim 2, wherein the digital image associated with the entity includes a digital image of the user.

5. The method of claim 2, wherein the digital image associated with the entity is a digital portrait of the user.

6. The method of claim 1, wherein the entity is a person or a group of people.

7. The method of claim 1, wherein determining the category of the file includes referencing a database that holds information indicating the category of the file.

8. The method of claim 1, wherein determining the category of the file includes:
   presenting to the user a plurality of predetermined categories; and
   requesting the user to select one of the predetermined categories as the category of the file in which the digital image is to be included.

9. The method of claim 8, wherein the plurality of predetermined categories includes a work category, a friends and family category, and a dating category.

10. The method of claim 1, further comprising:
    accessing, by the at least one processor, one of a plurality of data storage locations, each of the plurality of data storage locations being associated with a corresponding category and configured to store digital images associated with the entity and classified as belonging to the corresponding category; and
    retrieving, by the at least one processor, the predetermined digital images from one of the plurality of data storage locations.

11. The method of claim 10, wherein each of the plurality of data storage locations comprises a folder.

12. The method of claim 10, wherein access to one or more of the plurality of data storage locations requires a password.

13. The method of claim 12, further comprising:
    querying the user, by the at least one processor, for the password to access one of the plurality of data storage locations where the predetermined digital images are stored.

14. The method of claim 10, wherein at least one digital image stored in a respective one of the plurality of data storage locations is watermarked.

15. The method of claim 10, wherein a plurality of digital images associated with the entity are classified into different categories by the at least one processor and stored in respective data storage locations.

16. The method of claim 10, wherein a plurality of digital images associated with the entity are classified into different categories manually and stored in respective data storage locations.

17. The method of claim 1 further comprising:
    receiving, from the user, by the at least one processor, an input indicative of an intent to include in the file a given digital image other than the predetermined digital images; and
    providing to the user, by the at least one processor, a message that warns the user that the given digital image may be inappropriate for use with the file based on the category of the file.

18. The method of claim 1, wherein the file is being edited by the user using a corresponding application program.

19. The method of claim 1, wherein the file is a web page.

20. The method of claim 19, wherein the category of the file is determined based on a category of a website associated with the web page.

21. The method of claim 1, wherein the file is a word processor document.

22. The method of claim 1, wherein the file is a slide presentation.

23. The method of claim 1, wherein presenting the predetermined digital images associated with the entity for user selection of the digital image to be included in the file includes presenting only the predetermined digital images.

24. The method of claim 1, wherein presenting the predetermined digital images associated with the entity for user selection of the digital image to be included in the file includes presenting other digital images in addition to the predetermined digital images.

25. A non-transitory computer-readable medium having stored thereon program instructions that, when executed by at least one processor, cause the at least one processor to:
- determine a category of a file being edited by a user in response to a user action indicating an intent to include in the file a digital image associated with an entity, wherein the file is a web page, a word processor document, or a slide presentation; and
- based on the category of the file, present predetermined digital images associated with the entity for user selection of the digital image to be included in the file.

26. A digital image managing system, comprising:
- at least one processor;
- memory; and
- program instructions that are stored in the memory and, when executed by the at least one processor, cause the at least one processor to perform functions including:
- determining a category of a file being edited by a user in response to a user action indicating an intent to include in the file a digital image associated with an entity, wherein the file is a web page, a word processor document, or a slide presentation, and
- based on the category of the file, presenting predetermined digital images associated with the entity for user selection of the digital image to be included in the file.

27. A digital image managing method, comprising:
- determining, by at least one processor, a category of a file being edited by a user in response to a user action indicating an intent to include in the file a digital image associated with an entity, wherein the file is a web page, a word processor document, or a slide presentation;
- determining, by the at least one processor, whether a given digital image that the user intends to include in the file is associated with the category of the file; and
- if the given digital image is associated with a category different than the category of the file, providing to the user, by the at least one processor, a message that warns the user that the given digital image may be inappropriate for use with the file based on the category of the file.

\* \* \* \* \*